J. B. Johnson.
Corn Planter.

No. 92,728. Patented Jul. 20. 1869.

Witnesses: W. L. Cassell, L. W. Dowell

Inventor: John B. Johnson

United States Patent Office.

JOHN B. JOHNSON, OF ROCK ISLAND, ILLINOIS.

Letters Patent No. 92,728, dated July 20, 1869.

IMPROVEMENT IN CORN-PLANTERS.

The Schedule referred to in these Letters Patent and making part of the same.

*To all whom it may concern:*

Be it known that I, JOHN B. JOHNSON, of Rock Island, in the county of Rock Island, and State of Illinois, have invented certain new and useful Improvements in a Corn-Planter; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to corn-planters; and

It consists in the combination of foot-levers or treadles, with a rock-shaft and arms, connected with the seed-slides in such manner that said slides may be operated by the pressure of the driver's feet upon the treadles.

Also, in the construction and arrangement of the seed-slides, and in the manner of attaching the seed-hoppers.

Figure 1:
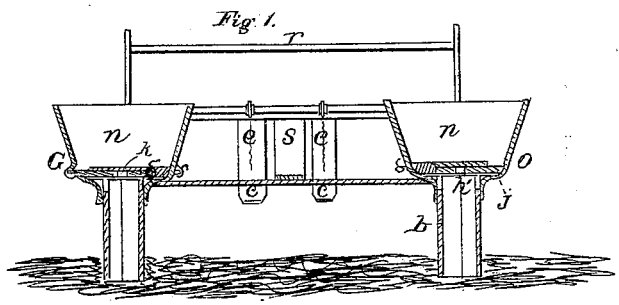
Figure 2:
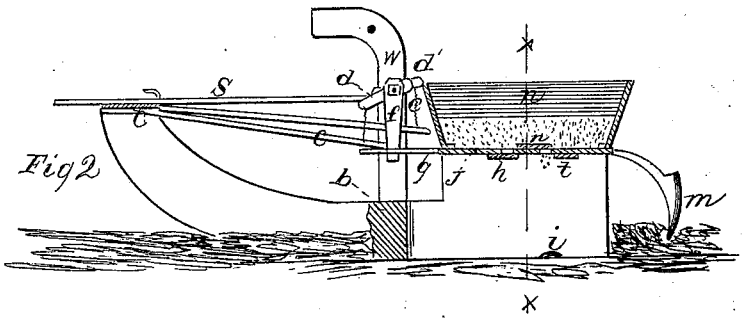

Figure 1 is a vertical cross-section of the machine, on the line $x$-$x$ of fig. 2.

Figure 3:
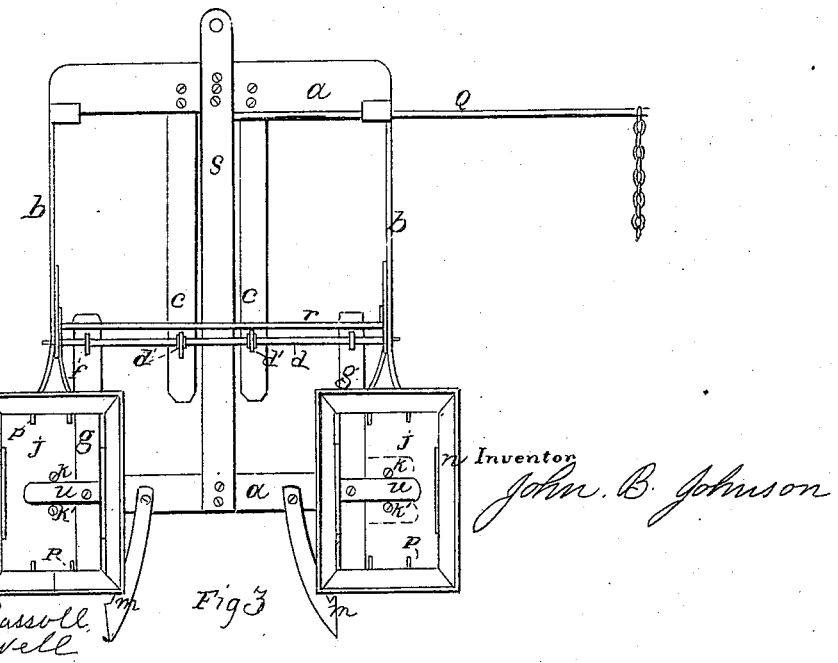

Figure 2, a longitudinal vertical section on the line $y$ $y$ of fig. 3; and

Figure 3, a top-plan view of the machine.

The machine consists of a frame mounted upon two parallel runners, which runners open the furrows, and have the seed dropped through their heels into the furrow, the runners having mounted directly upon them, at their rear ends, seed-hoppers, provided with seed-slides, to feed the corn, the said slides being operated by arms extending down from a rock-shaft, provided with arms, connected by chains with treadles in such a manner that the pressure of the feet alternately upon one and the other of the treadles will cause the corn to be dropped, a "hill" through each runner, and which is covered by arms or blades following in the rear of each runner.

$a$ $a$ represent the frame of the machine, connecting the two runners $b$ $b$, and having attached to its rear ends two blades $m$, one of which extends down behind each runner, and are for the purpose of filling in the earth over the seed, after it is deposited in the furrow.

On the upper side of each of the runners, at the rear end, I mount a seed-hopper, $n$, and provide them at their bottoms with plates $j$, held in place by lugs $p$, formed on the runners, and fitting into holes in the plate, as shown.

These plates are provided with two holes or cells, $k$ and $k'$, through which the seed is fed.

The plates $j$ do not fill the entire bottom of the hoppers, but leave a space on one side, running lengthwise of the machine, as shown.

This space is filled by a reciprocating bar or slide, $g$, of the same thickness as the plate $j$, and being flush therewith at top and bottom, as shown in fig. 1, the bar or slide extending out under the edge of the hopper, and projecting some distance forward, and having a slot in its front end, as shown.

To this bar I secure three arms, $t$, $u$, and $h$, one lying across on top of the plate $j$, and two close against it, on the under side, and all being for the purpose of shutting over the mouths of the seed-cells $k$ and $k'$, and regulating the flow of seed.

The two arms $h$ and $t$, on the under side of the slide $g$, are situated a short distance apart, and the upper arm $u$, located opposite the opening between them, as shown in figs. 2 and 3.

On each runner, just forward of its hopper, is a standard, $w$, the two being in line, and in these standards is mounted a horizontal rock-shaft, $d$, having secured, near each end, a pendent arm, $f$, which passes down through the slotted ends of the slides $g$.

This shaft has also secured to it, near its middle, two arms $d'$, horizontal, or nearly so, and extending out on opposite sides of the shaft, and each connected by a cord or chain with one of the treadles $c$, which are hinged to the front end of the frame, and extend back to near the rear of the machine, and in position such as to be conveniently operated by the feet of the driver, so that as one or the other of the treadles is operated, the rock-shaft will be caused to turn, and through the medium of the arms $f$, operate the slides $g$, and thus drop the seed.

The relation of the arms $h$ $u$ $t$ are to one another, and to the cells $k$ $k'$ such, that the cells are alternately closed at top and bottom, so as to receive a charge or "hill" of seed from the top, and then, at the reverse movement of the slide, discharge it at the bottom, down through the runner into the furrow.

The machine drops at each impulse of the slide, not requiring the motion forward and back, as in many others.

On the standards $w$, which support the rock-shaft, but above said shaft, is mounted a rod or bar, $r$, for the driver to hold by, to sustain, or steady himself, the bar being capable of adjustment up or down, and back and forward, by placing it in one or another of the series of holes in the standards.

Across the front end of the machine, I place a bar, Q, which extends out on one side of the frame, and is provided with a chain, which drags on the ground and marks for the next rows.

This bar is made reversible and adjustable, so as to mark right or left, and with the rows at any required distance apart.

The draught-poles of the machine is placed at the middle of the frame, and extends back to the rear cross-bar, and being placed high up, forms a guide-bar for the driver in planting.

The hoppers $n$ are secured in place by ears $o$, which lock down over horizontal flanges formed on the outside of the runner at their top, as shown in fig. 1.

The rear ends of the runner are made very low, and thus the seed-slides located sufficiently near the earth to drop the seed directly from the slide into the furrow, and thus dispense with the flipper-valve, or "double drop," commonly used.

By this mode of constructing the machine, I am enabled to produce a very cheap and efficient machine.

Having thus described my invention,

What I claim, is—

1. The slide $g$, having the plates $h$, $t$, and $u$, attached thereto, and arranged to operate in connection with the plate $j$, substantially as herein described.

2. The combination of the treadles $c$, rock-shaft $d$, with the arms $d'$, and pendants or levers $f$ attached, and the seed-slides $g$, all arranged to operate as herein set forth.

3. The combination of the removable plate $j$, held in position by the lugs $p$, and the detachable hoppers $n$, secured by the hooks $o$, whereby all the parts may be readily detached or replaced, as set forth.

JOHN B. JOHNSON.

Witnesses:
W. L. CARROLL,
I. W. POWELL.